(12) United States Patent
Yasui et al.

(10) Patent No.: US 6,223,992 B1
(45) Date of Patent: May 1, 2001

(54) AIR-CONDITIONING SYSTEM WITH TIMER DEVICE

(75) Inventors: Shigeaki Yasui; Akira Kanda, both of Nagoya (JP)

(73) Assignee: Rinnai Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/209,263

(22) Filed: Dec. 11, 1998

(30) Foreign Application Priority Data

Dec. 11, 1997 (JP) ...................................... 9-341210
Mar. 10, 1998 (JP) .................................... 10-058464

(51) Int. Cl.⁷ ................................ F23N 5/20; F28F 13/00
(52) U.S. Cl. .......................... 236/46 R; 165/267; 219/492
(58) Field of Search ........................... 236/46 R; 165/267; 219/492

(56) References Cited

U.S. PATENT DOCUMENTS 4,206,872 * 6/1980 Levine ................................ 236/46 R
4,235,368 * 11/1980 Weel .................................. 236/46 R
5,873,519 * 2/1999 Beilfuss .............................. 236/46 R

FOREIGN PATENT DOCUMENTS 58-106607  6/1983 (JP) .

* cited by examiner

Primary Examiner—William Wayner
(74) Attorney, Agent, or Firm—Birch, Stewart, Kolasch & Birch, LLP

(57) ABSTRACT

An air-conditioning system has an air-conditioning unit and a controller which includes a timer setting unit for establishing data including at least one time zone in the time of one day and an operation status in the time zone for the air-conditioning unit. The controller also has a memory for storing the data established by the timer setting means, and operation control unit for controlling operation of the air-conditioning unit according to the data stored by the memory. The timer setting unit includes a first setting unit for establishing the data altogether for all days of the week, a second setting unit for establishing the data for a plurality of groups divided from the days of the week, and a third setting unit for establishing the data individually for the days of the week. The first, second, and third setting units are selected by the timer setting unit to establish the data. Each time new data is established by either one of the first, second, and third setting units. The timer setting unit corrects the data stored by the memory into the new data and stores the new data in the memory.

7 Claims, 6 Drawing Sheets

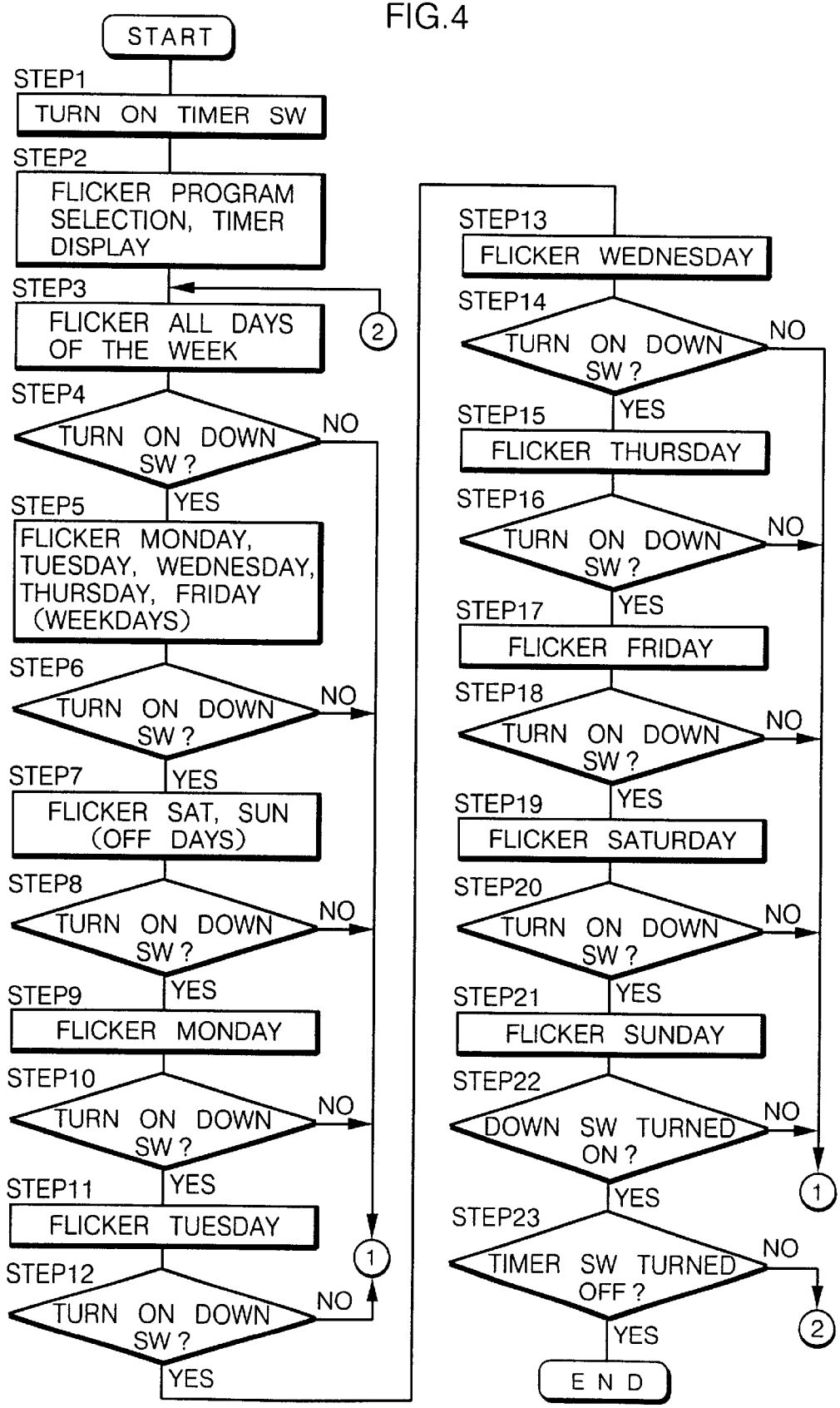

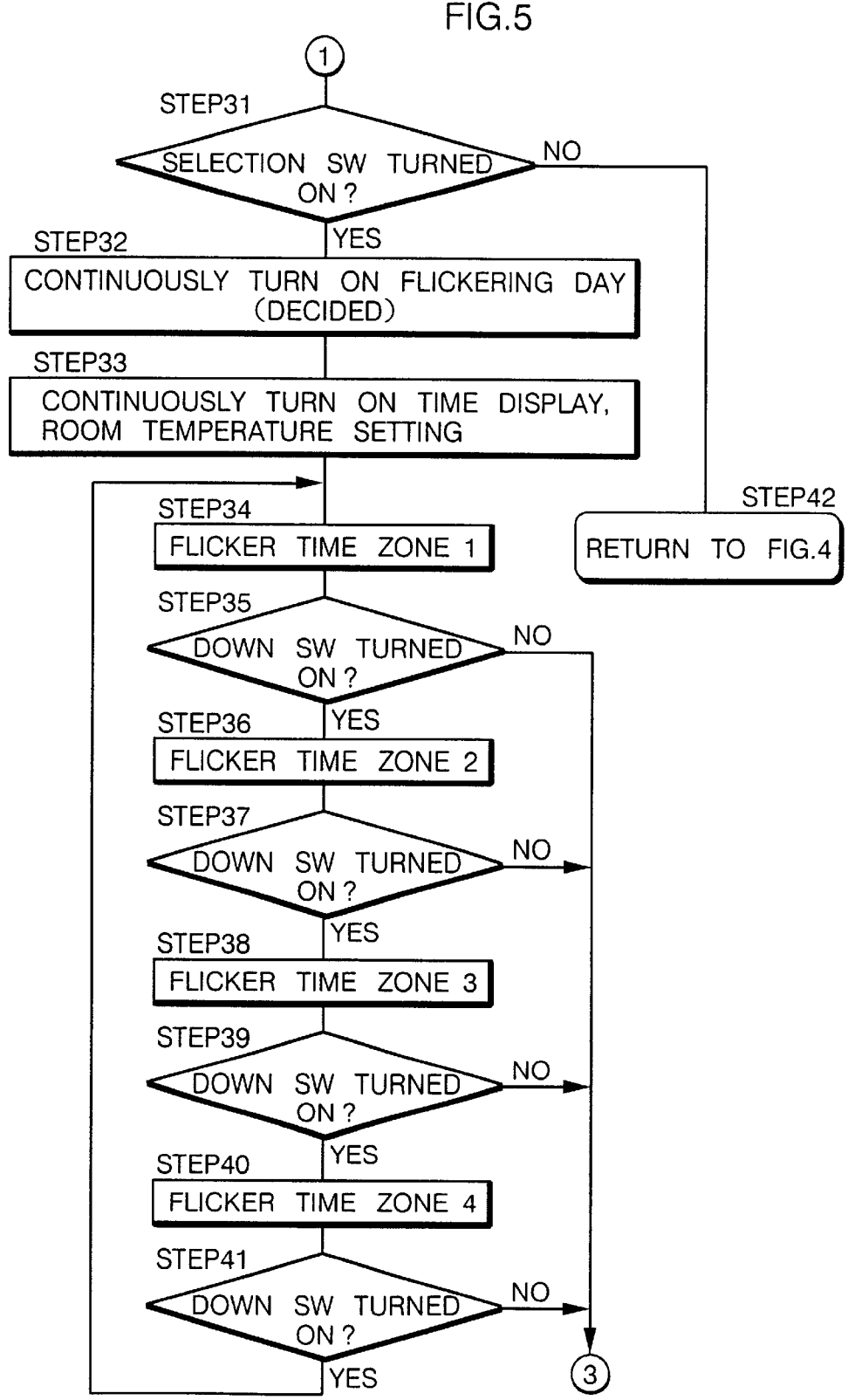

AIR-CONDITIONING SYSTEM WITH TIMER DEVICE

BACKGROUND OF THE INVENTION

1. Field of the Invention

The present invention relates to a timer device for establishing time zones and operation statuses of an air-conditioning unit.

2. Description of the Related Art

Some known air-conditioning units such as FF (Forced-Flue) type air heaters and air-conditioners are programmable by the user with a timer to establish data with respect to a time zone from a start-of-operation time to an end-of-operation time and operation statuses such as a desired room temperature in the time zone, and will operate according to the data programmed with the timer. Certain timers for use with air-conditioning units are capable of establishing time zones and operation statuses for different days. For example, one known timer divides one week into a plurality of groups of days, i.e., an off-day group of Sunday and Saturday, and an weekday group of the other days of the week. The timer can establish data respectively for the off-day group and the weekday group. Another known timer can establish data respectively for different days of the week.

With data thus established in advance for the respective days of the week using the timer, the air-conditioning unit can be operated only in the selected time zones at which the user wants the air-conditioning unit to air-condition the room to keep the room comfortable. Since the air-conditioning unit is turned off in the other time zones at which the user does not want the air-conditioning unit to air-condition the room, unwanted fuel consumption by the air-conditioning unit can be avoided.

If the timer is of the type which can establish data respectively for the off-day group and the weekday group, then different time zones cannot be established for individual days, e.g., a time zone only for Wednesday cannot be established so as to be different from time zones for other days in the weekday group. The timer of this type is thus not convenient to use. The timer that is of the type which can establish data, e.g., time zones and operation statuses, for the individual days of the week is also disadvantageous in that the user has to establish time zones, one by one, for the days ranging from Monday through Sunday. Even if the time zones to be established are all identical to each other, the user is required to carry out the setting process for all the days of the week, i.e., to repeat the same setting process seven times for the week. The entire setting process is therefore a tedious and time-consuming task.

SUMMARY OF THE INVENTION

It is therefore an object of the present invention to provide an improved air-conditioning system with a timer device.

Another object of the present invention is to provide a timer device which is capable of easily and flexibly establishing time zones and operation statuses for an air-conditioning unit.

To achieve the above objects, there is provided in accordance with the present invention an air-conditioning system comprising an air-conditioning unit, timer setting means for establishing data including at least one time zone in the time of one day and an operation status in the time zone for the air-conditioning unit, memory means for storing the data established by the timer setting means, and operation control means for controlling operation of the air-conditioning unit according to the data stored by the memory means. The timer setting means includes first setting means for establishing the data altogether for all days of the week, second setting means for establishing the data for a plurality of groups divided from the days of the week, and third setting means for establishing the data individually for the days of the week. The first setting means, the second setting means, and the third setting means are selected by the timer setting means to establish the data, and each time new data is established by either one of the first setting means, the second setting means, and the third setting means, the timer setting means corrects the data stored by the memory means into the new data and stores the new data in the memory means.

The user can establish the data altogether for all the days of the week by the first setting means. Therefore, if common time zones and operation statuses are to be established for all the days of the week, they can easily be established by the first setting means. The days of the week may be divided into a plurality of groups, and the data can be established for the groups by the second setting means. For example, if one week is divided into a plurality of groups, e.g., an off-day group and a weekday group, then time zones and operation statuses can be established for the off-day and weekday groups by the second setting means. The data can also be established individually for the days of the week by the third setting means. Since different time zones can be established individually for the days of the week, the time zones can flexibly be established such that the air-conditioning unit will start a heating process early in the morning on weekdays and late in the morning in off-days.

Each time new data is established by either one of the first setting means, the second setting means, and the third setting means, the timer setting means corrects the data stored by the memory means into the new data and stores the new data in the memory means. Consequently, after time zones and operation statuses have been established altogether for all the days of the week or the groups by the first setting means or the second setting means, if data different from those for other days are established for a certain day by the third setting means, then the stored data for the certain day is corrected into the data established for the certain day, and stored in the memory means. The stored data for the other days are not corrected. Therefore, the air-conditioning unit can flexibly be programmed by the third setting means.

If the user correct the data altogether for all the days of the week or the groups while data have been established individually for the days of the week by the third setting means, then the user can establish new data with the first setting means or the second setting means for correcting the existing data altogether for all the days of the week or the groups.

Preferably, the timer setting means comprises means for overwriting the data stored by the memory means with the new data. With the data being thus corrected, the data established respectively by the first setting means, the second setting means, and the third setting means can be stored by the memory means which comprises a single memory. The data may be corrected by the timer setting means by assigning respective memory means to the first setting means, the second setting means, and the third setting means, and storing data in the respective memory means each time the data are established by the first setting means, the second setting means, and the third setting means. According to this alternative, the operation control means controls operation of the air-conditioning unit with latest data of the data stored in the memory means assigned respectively to the first setting means, the second setting means, and the third setting means. Alternatively, the user may determine which data of the data stored in the memory means assigned respectively to the first setting means, the second setting means, and the third setting means are to be used, and the operation control means may control operation of the air-conditioning unit with the data desired by the user.

The operation status includes at least a room temperature setting and information indicating whether the air-conditioning unit is to be operated or not. The user can thus operate the air-conditioning unit for a time zone established by the user according to the operation status including a temperature setting and information indicating whether the air-conditioning unit is to be operated or not. The operation status can flexibly be established in the manner described above.

If each of the first setting means, the second setting means, and the third setting means can establish a plurality of time zones in the time of one day, then a time zone in which the air-conditioning unit is to operate and a time zone in which the air-conditioning unit is not to operate can be established in one day to avoid unwanted operation of the air-conditioning unit. Time zones with different operation statuses may be established in view of temperature changes in one day. For example, the heating capability (room temperature setting) of the air-conditioning unit may be increased in low-temperature periods in morning and night, and may be reduced in a high-temperature period in daytime, so that the air-conditioning unit can be operated according to a flexible pattern in each day.

Each of the first setting means, the second setting means, and the third setting means may establish start-of-operation times respectively for the time zones, each of the time zones extending from the start-of-operation time of the time zone to the start-of-operation time of the next time zone. With the time zones thus defined, each of the time zones can easily be established simply by establishing its start-of-operation time, without the need for establishing its end-of-operation time.

Preferably, the air-conditioning system further includes display means for displaying the data, the timer setting means comprising means for enabling the display means to display any of the data established by the first setting means, the second setting means, and the third setting means, and correcting any of the data established by the first setting means, the second setting means, and the third setting means, when the establishment of the data by the first setting means, the second setting means, and the third setting means is finished. With this arrangement, the data established by the first setting means, the second setting means, and the third setting means can easily be confirmed, and can also easily be corrected. If the timer setting means can successively select the first setting means, the second setting means, and the third setting means, then the timer setting means may enter a mode for waiting for the establishment of data by a next one of the first setting means, the second setting means, and the third setting means when the establishment of the data by one of the first setting means, the second setting means, and the third setting means is finished. The timer setting means thus arranged is also capable of establishing time zones and an operation status in each of the time zones for the air-conditioning unit.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 4 is a flowchart of an operation sequence of a controller for selecting first, second, and third setting means;

FIG. 5 is a flowchart of an operation sequence of the controller for selecting first through fourth time zones.

DETAILED DESCRIPTION OF THE PREFERRED EMBODIMENT

Figure 1:
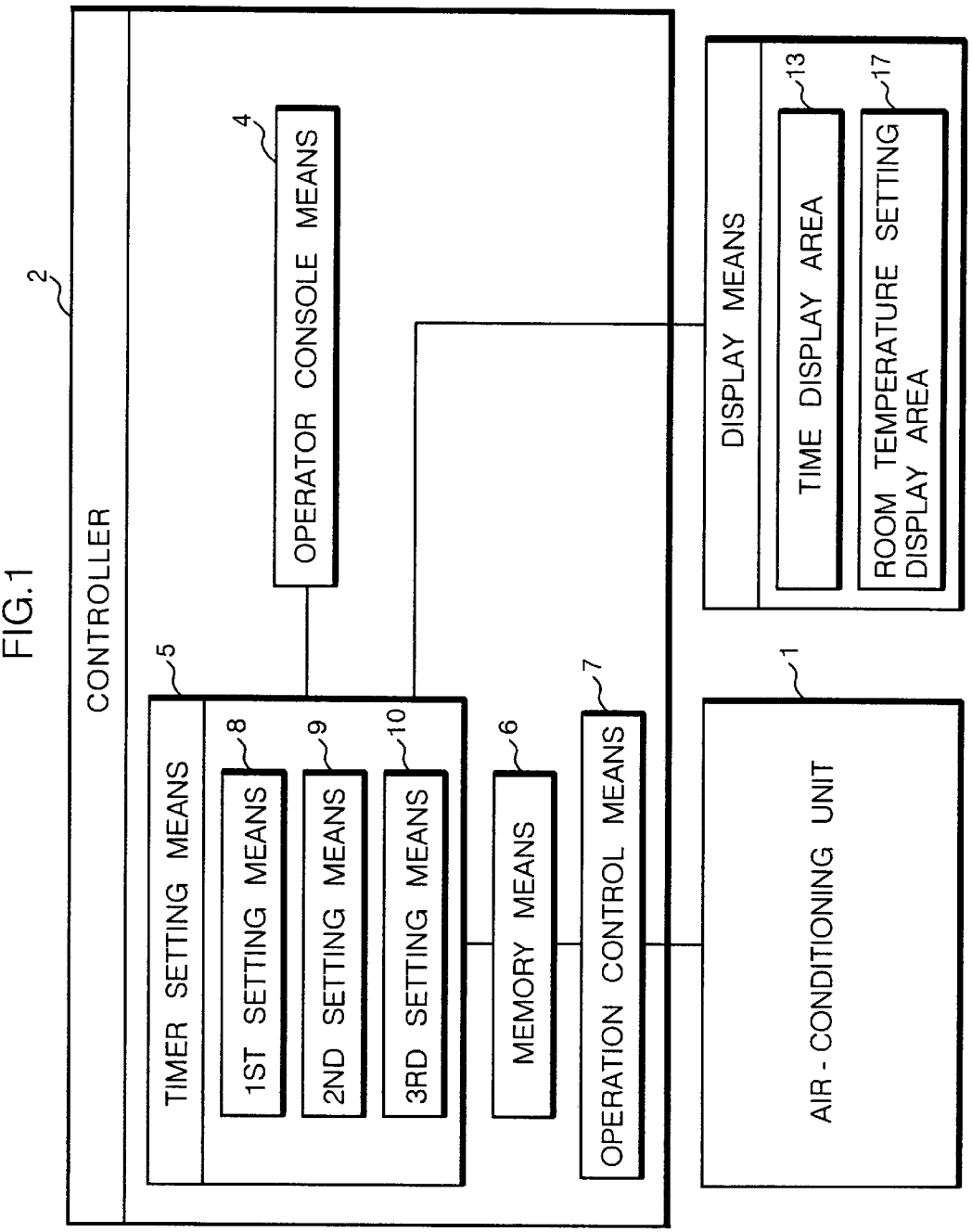
FIG. 1 is a block diagram of a functional arrangement of an air-conditioning system with a timer device according to the present invention.

As shown in FIG. 1, an air-conditioning system with a timer device according to the present invention comprises an air-conditioning unit 1 and a controller 2 for controlling the air-conditioning unit 1. In the illustrated embodiment, the air-conditioning unit 1 comprises an FF-type air heater to be installed in a room for heating the room.

The controller 2 comprises an operator console means 4 including a control panel 3 (see FIG. 2) which can be operated by the user to enter data of time zones and operation statuses, timer setting means 5 operated by the operator console means 4 to select first, second, and third setting means 8, 9, 10 to establish data, a memory means 6 for storing data established by the timer setting means 5, and an operation control means 7 for controlling the air-conditioning unit 1 with data stored in the memory means 6. The first setting means 8 is for establishing altogether data with respect to all days of the week ranging from Monday through Sunday, the second setting means 9 is for establishing altogether data with respect to groups of days of the week including a weekday group of Monday through Friday and an off-day group of Sunday and Saturday, and the third setting means 10 for establishing data for individual days of the week.

Figure 2:
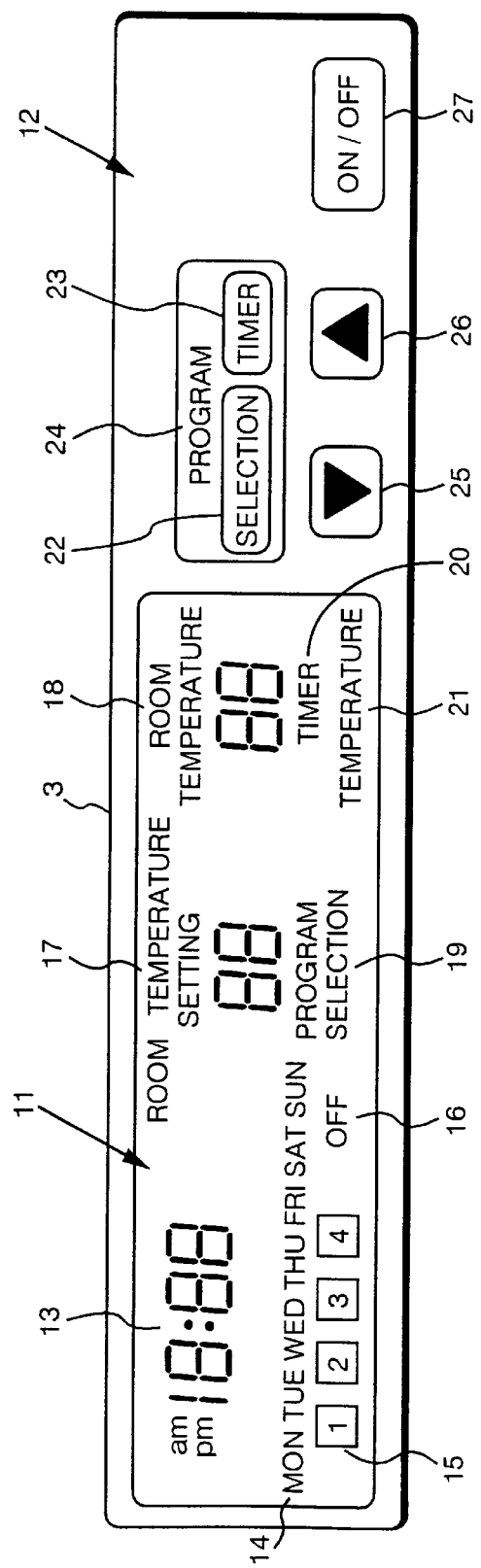
FIG. 2 is a view of a control panel of an air-conditioning unit.

As shown in FIG. 2, the control panel 3 comprises a display area 11 disposed on a left-hand side thereof and an operation area 12 on a right-hand side thereof. The display area 11 includes in an upper left-hand region thereof a time display area 13 (display means) for displaying a time, and a day display area 14 for displaying days of the week ranging from Monday through Sunday. The display area 11 also includes in a lower left-hand region thereof a time zone display area 15 for displaying four time zones 1–4 that can be established within the time of one day, and an operation stop display area 16 positioned on the right-hand side of the time zone display area 15, for displaying that an operation turn-off is indicated upon timer setting. The display area 11 also includes in an upper right-hand region thereof a room temperature setting display area 17 (display means) for displaying a temperature setting entered by the user, and a room temperature display area 18 for displaying a room temperature detected by a room temperature sensor (not shown). The display area 11 further includes a lower right-hand region thereof a program selection display area 19 for displaying that timer setting is being carried out, a timer display area 20 for displaying that a time zone is being established, and a temperature display area 21 for displaying that a room temperature setting is being established.

The operation area 12 includes in an upper left-hand region thereof a selection switch 22 for deciding on various settings, and a timer switch 23 for turning on/off a timer setting mode. The selection switch 22 and the timer switch 23 jointly serve as a program switch 24. The operation area 12 also includes in a lower left-hand region thereof a down switch 25 and an up switch 26 for changing times in establishing time zones and changing temperatures in establishing target temperatures. The operation area 12 further includes in a right-hand region thereof a power switch 27 for turning on/off the air-conditioning unit 1.

Figure 3A:
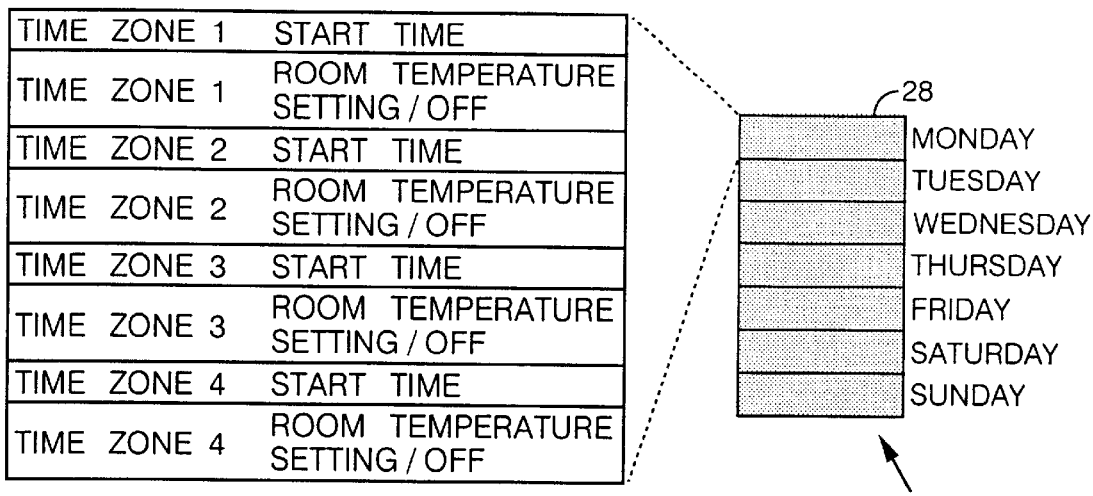
FIG. 3(a) is a diagram showing the manner in which data are stored in all areas of a memory.
Figure 3B:
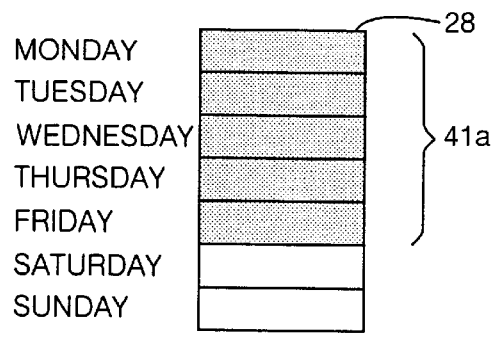
FIG. 3(b) is a diagram showing the manner in which data are stored in the areas of a weekday group of the memory.
Figure 3C:
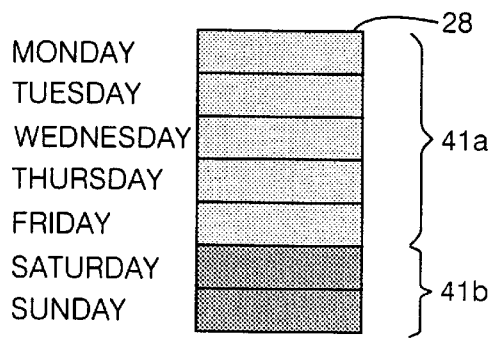
FIG. 3(c) is a diagram showing the manner in which data are stored in the areas of an off-day group of the memory.
Figure 3D:
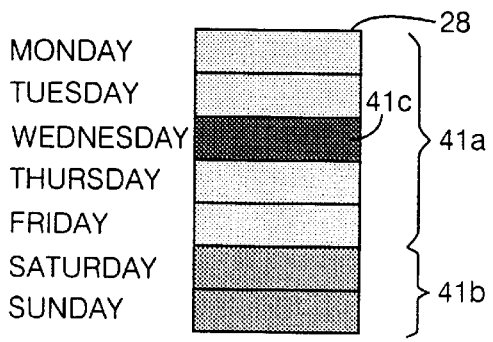
FIG. 3(d) is a diagram showing the manner in which data is stored to overwrite the area of an individual day, of the areas of the weekday group of the memory.

The memory means 6 has a memory 28 (see FIGS. 3(a)–3(d)) for storing time zones and operation statuses that have been established by the operator console means 4 and the timer setting means 5. As shown in FIG. 3(a), the memory 28 is divided into seven areas which correspond to the respective days of the week ranging from Monday through Sunday. Each of the seven areas of the memory 28 is divided into eight areas for storing start-of-operation times of time zones 1 through 4, and room temperature settings or operation stop information (OFF) in the time zones 1 through 4.

Figure 6:
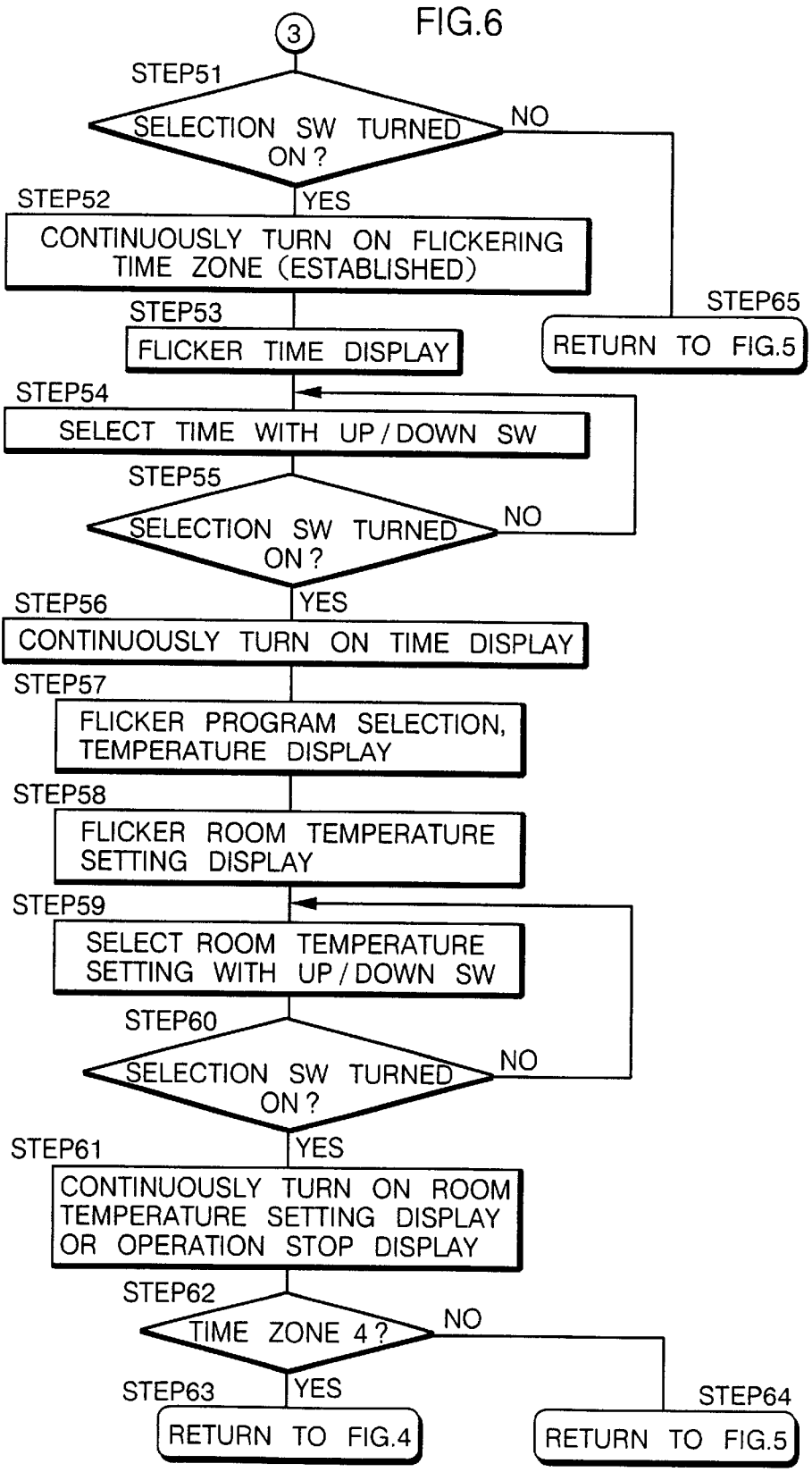
FIG. 6 is a flowchart of an operation sequence of the controller for establishing a start-of-operation time and an operation status in each of the time zones.

Timer setting operation for the air-conditioning unit 1 will be described below with reference to FIGS. 4 through 6. FIG. 4 shows an operation sequence of the controller 2 for selecting the first, second, and third setting means 8–10. FIG. 5 shows an operation sequence of the controller 2 for selecting the first through fourth time zones 1–4. FIG. 6 shows an operation sequence of the controller 2 for establishing a start-of-operation time and an operation status in each of the time zones.

First, an operation sequence of the controller 2 for selecting the first, second, and third setting means 8–10 will be described below with reference to FIG. 4. When the user wants to make timer settings, the user turns on the timer switch 23 of the program switch 24 shown in FIG. 2 in STEP1. The program selection display area 19 and the timer display area 20 of the display area 11 are flickered in STEP2, and all the days of the week in the day display area 14 are flickered in STEP3.

When data of all days of the week are to be established by the first setting means 8, the user does not press the down switch 25 (NO in STEP4), causing control to jump to the operation sequence shown in FIG. 5, and the user presses the selection switch 22 (YES in STEP31). All the days in the day display area 14 which have been flickering are now continuously turned on, deciding on the setting for all the days of the week in STEP32. Then, the user establishes data of start-of-operation times for the respective time zones 1 through 4 and operation statuses such as room temperature settings and operation stops for the respective time zones 1 through 4 with respect to all the days of the week, as described later on.

When the user wants to establishes data altogether for off-day and weekday groups divided from the days of the week with the second setting means 9, the user presses the down switch 25 (YES in STEP4) while all the days of the week in the day display area 14 are flickering in STEP3. The days belonging to the weekday group ranging from Monday through Friday in the day display area 14 are flickered in STEP5. The user does not press the down switch 25 (NO in STEP6), causing control to jump to the operation sequence shown in FIG. 5, and the user presses the selection switch 22 (YES in STEP31). The weekday group in the day display area 14 which has been flickering is now continuously turned on, deciding on the setting for the weekday group in STEP32. Then, the user establishes data of start-of-operation times for the respective time zones 1 through 4 and operation statuses such as room temperature settings and operation stops for the respective time zones 1 through 4 with respect to the weekday group. After the user has established data for the weekday group, the days belonging to the off-day group, i.e., Saturday and Sunday, in the day display area 14 are flickered in STEP7. The user then operates the control panel 3 in the same manner as with the setting of data for the weekday group, for establishing data with respect to the off-day group.

When the user wants to establishes data for the individual days of the week with the third setting means 10, the user presses the down switch 25 three times in STEP4, STEP6, STEP8 while all the days of the week in the day display area 14 are flickering in STEP3. Then, only Monday in the day display area 14 is flickered in STEP9. The user does not press the down switch 25 (NO in STEP10), causing control to jump to the operation sequence shown in FIG. 5, and the user presses the selection switch 22 (YES in STEP31). Monday in the day display area 14 which has been flickering is now continuously turned on, deciding on the setting for the Monday in STEP32. Then, the user establishes data of start-of-operation times for the respective time zones 1 through 4 and operation statuses such as room temperature settings and operation stops for the respective time zones 1 through 4 with respect to Monday. After the user has established data for Monday, Tuesday in the day display area 14 is flickered in STEP11. The user then operates the control panel 3 in the same manner as with the setting of data for Monday, for establishing data with respect to Tuesday. Thereafter, the user repeats the above process to establish data with respect to all the individual days of the week.

When the user has established data until Sunday and wants to finish the timer setting operation, the user presses the timer switch 23 to turn off the timer setting operation (YES in STEP23). The timer setting operation is now finished. The controller 2 for the air-conditioning unit 1 is arranged such that insofar as the timer switch 23 is turned on in STEP1, the timer setting operation will be turned off when the user presses the timer switch 23 anywhere in the timer setting operation.

An operation sequence of the controller 2 for selecting the first through fourth time zones 1–4 after a day or days have been selected for establishing data according to the operation sequence shown in FIG. 4 will be described below with reference to FIG. 5. If all days of the week, the weekday group, the off-day group, or individual days of the week are selected according to the operation sequence shown in FIG. 4, and the user presses the selection switch 22 (YES in STEP31), then the day display area 14 which has been flickering is continuously turned on, deciding on the setting for the selected days or group in STEP32. At this time, the time display area 13 and the room temperature setting display area 17 are continuously turned on in STEP33, and the time zone 1 in the time zone display area 15 is flickered in STEP34.

If the user does not press the selection switch 22 (NO in STEP31), then control returns to the operation sequence shown in FIG. 4 where it has jumped to the operation sequence shown in FIG. 5, in STEP42. For example, if all the days of the week have been selected, then control returns to STEP4. Thereafter, if the down switch 25 and the selection switch 22 are not pressed for a given period of time, then the timer setting operation is finished. As described above, if the user presses the timer switch 23 while in the timer setting operation, then the timer setting operation is also finished.

For establishing a start-of-operation time for the time zone 1, while the time zone 1 in the time zone display area 15 is flickering in STEP34, the user does not press the down switch 25 (NO in STEP35), causing control to jump to the operation sequence shown in FIG. 6, and then the user presses the selection switch 22 (YES in STEP51). The user then establishes a start-of-operation time and data such as a temperature setting for the time zone 1, as described later on.

When the setting of data for the time zone 1 is finished, control returns from the operation sequence shown in FIG. 6 to the operation sequence shown in FIG. 5, and the time zone 1 in the time zone display area 15 is flickered in STEP36. Alternatively, if the user presses the down switch 35 (YES in STEP35) while the time zone 1 in the time zone display area 15 is flickering in STEP34, then the time zone 1 in the time zone display area 15 is flickered in STEP36. If the user wants to establish data for the time zone 2, then the user does not press the down switch 25 (NO in STEP37), causing control to jump to the operation sequence shown in FIG. 6, and then the user establishes desired data as described later on. In this manner, the user can also establish data for the time zones 3, 4.

An operation sequence of the controller 2 for establishing a start-of-operation time and an operation status, such as a room temperature setting or an operation stop, after a time zone or time zones have been selected according to the operation sequence shown in FIG. 5 will be described below with reference to FIG. 6. For establishing a start-of-operation time for each time zone, the user does not press the down switch 25, but presses the selection switch 22 while a time zone, e.g., the time zone 1, in the time zone display area 15 is flickering (YES in STEP51). The time zone 1 in the time zone display area 15 which has been flickering is now continuously turned on in STEP52, deciding on the setting for the time zone 1. At this time, the time display area 13 is flickered in STEP53. The user increments or decrements the time displayed in the time display area 13 with the up switch 26 or the down switch 25 to select a desired start-of-operation time in STEP54. Thereafter, the user presses the selection switch 22 (YES in STEP55), entering the selected start-of-operation time. In this embodiment, start-of-operation times and end-of-operation times for the time zones are established by entering only start-of-operation times for the time zones 1 through 4. For example, when a start-of-operation time for the time zone 1 and a start-of-operation time for the time zone 2 are entered, the start-of-operation time for the time zone 2 becomes an end-of-operation time for the time zone 1.

After the times have thus been entered, the program selection display area 19 and the temperature display area 21 are flickered in STEP57, and the room temperature setting display area 17 is flickered in STEP58. The user increments or decrements the temperature displayed in the room temperature setting display area 17 with the up switch 26 or the down switch 25 to select a desired room temperature in STEP59. Thereafter, the user presses the selection switch 22 (YES in STEP60), entering the room temperature setting, and the room temperature setting display area 17 is continuously turned on in STEP61.

If the user continuously presses the down switch 25 while the room temperature setting display area 17 is flickering in STEP58, the temperature displayed in the room temperature setting display area 17 gradually decreases to a minimum room temperature setting of "16", indicating a room temperature setting of 16° C. When the user further presses the down switch 25, the room temperature setting display area 17 is turned off, and the operation stop display area 16, in the form of "OFF", on the right-hand side of the time zone display area 15 in FIG. 2 is flickered. When the selection switch 22 is pressed (YES in STEP60), the operation stop display area 16 is continuously turned on in STEP61. The air-conditioning unit 1 will be shut off in the time zone.

After the start-of-operation time and operation status have been established for a time zone, it is confirmed which time zone has been established. If the start-of-operation time and operation status have been established for the time zone 4 (YES in STEP62), then control returns to the operation sequence shown in FIG. 4 in STEP63. For example, if the setting of data for the time zone 4 is finished while data for all the days of the week are being established, then all the days in the day display area 14 are flickered in STEP3 in the operation sequence shown in FIG. 4. Alternatively, if the setting of data for the time zone 4 is finished while data for all the days of the week are being established, then the weekday group in the day display area 14 may be flickered in STEP5. If data for other than the time zone 4 have been established (NO in STEP62), then control returns to the operation sequence shown in FIG. 5 in STEP64. For example, if the setting of data for the time zone 1 is finished, then the time zone 2 in the time zone display area 15 is flickered in STEP36 in the operation sequence shown in FIG. 5.

If the selection switch 22 is not pressed (NO in STEP51), then control returns to the operation sequence shown in FIG. 5 where it has jumped to the operation sequence shown in FIG. 6, in STEP65. For example, if the down switch 25 is not pressed while the time zone 1 in the time zone display area 15 is flickering in STEP34 in the operation sequence shown in FIG. 5, then control returns to STEP51 shown in FIG. 6. If the down switch 25 is pressed and the selection switch 22 is not pressed, then the time zone 2 in the time zone display area 15 is flickered in STEP36 in the operation sequence shown in FIG. 5.

A specific example in which the first setting means 8 establishes common time zones and operation statuses altogether for all the days of the week, with different temperatures for the respective times zones 1 through 3 and an operation stop of the air-conditioning unit 1 for the time zone 4, will be described below.

For effecting a timer setting operation, the user turns on the timer switch 23 of the program switch 24 shown in FIG. 2 in STEP1. The program selection display area 19 and the timer display area 20 of the display area 11 are flickered in STEP2, and all the days of the week in the day display area 14 are flickered in STEP3. If the user does not press the down switch 25 (NO in STEP4) and presses the selection switch 22 (YES in STEP31), then all the days in the day display area 14 which have been flickering are now continuously turned on, deciding on the setting for all the days of the week in STEP32. At this time, the time display area 13 and the room temperature setting display area 17 are continuously turned on in STEP33, and the time zone 1 in the time zone display area 15 is flickered in STEP34.

For establishing a start-of-operation time for the time zone 1, while the time zone 1 in the time zone display area 15 is flickering in STEP34, the user does not press the down switch 25 (NO in STEP35) and presses the selection switch 22 (YES in STEP51). The time zone 1 in the time zone display area 15 which has been flickering is continuously turned on in STEP52. The time display area 13 which has been continuously turned on is now flickered in STEP53. The user selects a desired start-of-operation time with the up switch 26 or the down switch 25 in STEP54. Thereafter, the user presses the selection switch 22 (YES in STEP55), entering the selected start-of-operation time, and the time display area 13 is continuously turned on in STEP56. When the selected start-of-operation time is entered, the program selection display area 19 and the temperature display area 21 are flickered in STEP57, and the room temperature setting display area 17 which has been continuously turned on is flickered in STEP58, and the user selects a desired room temperature setting in STEP59. When the user presses the selection switch 22 (YES in STEP60), the selected room temperature setting is entered, and the room temperature setting display area 17 is continuously turned on in STEP61.

After the start-of-operation time and the room temperature setting for the time zone 1 have thus been established, since the present time zone is not the time zone 4 (NO in STEP62), the time zone 2 in the time zone display area 15 is flickered in STEP36. The user then establishes a start-of-operation time and a room temperature setting for the time zone 2 in the same manner as with the time zone 1. After the start-of-operation time and the room temperature setting for the time zone 2 have been established, the time zone 3 in the time zone display area 15 is now flickered in STEP38. The user then establishes a start-of-operation time and a room temperature setting for the time zone 3 in the same manner as with the time zone 1.

Then, data for the time zone 4 are established as follows: After the start-of-operation time and the room temperature setting for the time zone 3 have been established, the time zone 4 in the time zone display area 15 is flickered in STEP40. To establish a start-of-operation time for the time zone 4, while the time zone 4 in the time zone display area 15 is flickering in STEP40, the user does not press the down switch 25 (NO in STEP41), but presses the selection switch 22 (YES in STEP51). As with the time zone 1, the user presses the selection switch 22 to enter a start-of-operation time (YES in STEP55).

When the selected start-of-operation time is entered, the program selection display area 19 and the temperature display area 21 are flickered in STEP57, and the room temperature setting display area 17 is flickered in STEP58. The user continuously presses the down switch 2 5 to flicker the operation stop display area 16, in the form of "OFF". The user presses the selection switch 22 (YES in STEP60), and the operation stop display area 16 is continuously turned on in STEP61. The data have now been established such that the air-conditioning unit 1 will be shut off in the time zone 4.

After the time zones 1 through 4 and the operation statuses have been established with respect to all the days of the week ranging from Monday through Sunday as described above, the established data are transmitted from the timer setting means 5 to the memory means 6. In the memory means 6, the data of the start-of-operation times and the operation statuses for the time zones 1 through 4 are stored in all areas 41 of the memory 28 which correspond respectively to all the days of the week ranging from Monday through Sunday, as indicated by a shaded area in FIG. 3(a).

When the setting of data for all the days of the week is finished, the timer setting means 5 flickers all the days in the day display area 14 in STEP3. The user does not press the down switch 25 (NO in STEP4), but presses the selection switch 22 (YES in STEP31). All the days of the week in the day display area 14 which have been flickering is continuously turned on in STEP32. The time display area 13 and the room temperature setting display area 17 are continuously turned on in STEP33, and the time zone 1 in the time zone display area 15 is flickered in STEP34. At this time, the time display area 13 displays the entered start-of-operation time for the time zone 1, and the room temperature setting display area 17 displays the room temperature established for the time zone 1. Therefore, the user can easily confirm whether the data for the time zone 1 have properly been established or not.

If the data for the time zone 1 have properly been established, then since the data do not need to be corrected, the user presses the down switch 25 (YES in STEP35) to flicker the time zone 2 in STEP36 for confirming the start-of-operation time and the room temperature setting established for the time zone 2. If the data for the time zone 2 have not properly been established, then it is necessary to correct the data for the time zone 2. For example, if the user wants to correct the start-of-operation time of the time zone 2, then the user does not press the down switch 25 (NO in STEP37), but presses the selection switch 22 (YES in STEP51), and corrects the start-of-operation time of the time zone 2 in the same manner as described above.

When the user presses the selection switch 22 (YES in STEP55), the time display area 13 is continuously turned on in STEP56, the program selection display area 19 and the temperature display area 21 are flickered in STEP57, and the room temperature setting display area 17 is flickered in STEP58. Since the room temperature setting is not changed, the user presses the selection switch 22 (YES in STEP60). In this manner, the data for the time zone 2 are corrected. Inasmuch as the present time zone is not the time zone 4 (NO in STEP62), control returns to the operation sequence shown in FIG. 5 in STEP64, and the time zone 3 in the time zone display area 15 is flickered in STEP38. The user then confirms or corrects the data established for the time zones 3, 4.

When the data established for the time zone 4 have been confirmed or corrected (YES in STEP62), the confirmed or corrected data are transmitted from the timer setting means 5 to the memory means 6. The timer setting means 5 returns to the operation sequence shown in FIG. 4 to flicker all the days of the week in the day display area 14 again in STEP3. Because the data for all the days of the week have been established, confirmed, and corrected, the user presses the timer switch 23 of the program switch 24 to finish the timer setting operation.

If the power supply switch 27 is turned on, then the operation control means 7 controls the air-conditioning unit 1 according to the data of the time zones and the operation statuses such as room temperature settings and operation stops which have been established by the timer setting means 5 and stored in the memory means 6. Specifically, at the start-of-operation time of the time zone 1, the operation control means 7 controls the air-conditioning unit 1 to equalize the actual room temperature to the room temperature setting established for the time zone 1. When the start-of-operation time of the time zone 2 is reached, the operation control means 7 finishes the control of the air-conditioning unit 1 in the time zone 1, and controls the air-conditioning unit 1 to equalize the actual room temperature to the room temperature setting established for the time zone 2. The operation control means 7 similarly controls the air-conditioning unit 1 in the time zone 3. When the start-of-operation time of the time zone 4 is reached, the operation control means 7 finishes the control of the air-conditioning unit 1 in the time zone 3. Since the operation status for the time zone 4 is set to an operation stop, the operation control means 7 shuts off the air-conditioning unit 1 in the time zone 4. When the start-of-operation time of the time zone 1 is reached again, the operation control means 7 controls again the air-conditioning unit 1 to equalize the actual room temperature to the room temperature setting established for the time zone 1. Since the time zones and the operation statuses have been entered altogether for all the days of the week, the operation control means 7 controls the air-conditioning unit 1 in the same pattern for all the days of the week insofar as the power supply switch 27 is turned on.

Another specific example will be described below. According to this example, when the setting of data with the first setting means 8 is finished, the timer setting means 5 enters a mode for waiting for the setting of data with the second setting means 9. Similarly, when the setting of data with the second setting means 9 is finished, the timer setting means 5 enters a mode for waiting for the setting of data with the third setting means 10, and when the setting of data with the third setting means 10 is finished, the timer setting means 5 enters a mode for waiting for the setting of data with the first setting means 8. In this example, all the days of the week ranging from Monday through Sunday are divided into a weekday group and an off-day group, and time zones and data such as room temperature settings are established for the weekday group and the off-day group by the second setting means 9, and time zones and data such as room temperature settings are established independently for Wednesday by the third setting means 10.

The user turns on the timer switch 23 of the program switch 24 in STEP1. The program selection display area 19 and the timer display area 20 of the display area 11 are flickered in STEP2, and all the days of the week in the day display area 14 are flickered in STEP3. If the user presses the down switch 25 (YES in STEP4), then the days belonging to the weekday group ranging from Monday through Friday in the day display area 14 are flickered in STEP5. The user does not press the down switch 25 (NO in STEP6), but presses the selection switch 22 (YES in STEP31). The weekday group in the day display area 14 which has been flickering is now continuously turned on in STEP32. The time display area 13 and the room temperature setting display area 17 are continuously turned on in STEP33, and the time zone 1 in the time zone display area 15 is flickered in STEP34.

Thereafter, the user enters start-of-operation times and operation statuses for the time zones 1 through 4 for the weekday group, and presses the selection switch 22 (YES in STEP60). When the selection switch 22 is pressed, the start-of-operation times and the operation statuses which have been entered are transmitted from the timer setting means 5 to the memory means 6, which stores the start-of-operation times and the operation statuses altogether for the weekday group. As shown in FIG. 3(*b*), the established data are stored in respective areas 41*a* of the memory 28 which correspond to Monday through Friday.

When the setting of data up to the time zone 4 for the weekday group is finished in STEP63, the days belonging to the off-day group, i.e., Saturday and Sunday, in the day display area 14 are flickered in STEP7. The user enters start-of-operation times and operation statuses for the time zones 1 through 4 for the off-day group, in the same manner as with the weekday group. When the setting of data up to the time zone 4 for the off-day group is finished (YES in STEP62), the start-of-operation times and the operation statuses which have been entered are transmitted from the timer setting means 5 to the memory means 6, which stores the start-of-operation times and the operation statuses altogether for the off-day group. As shown in FIG. 3(*c*), the established data are stored in respective areas 41*b* of the memory 28 which correspond to Saturday and Sunday.

When the setting of data for the off-day group is finished, Monday in the day display area 14 is flickered in STEP9. Since data for only Wednesday in the weekday group are to be individually established in this example, the user presses the down switch 25 twice (YES in STEP10, STEP12). Wednesday in the day display area 14 is flickered in STEP13. For changing start-of-operation times and operation statuses for Wednesday, the user does not press the down switch (NO in STEP14), but presses the selection switch 2 (YES in STEP31).

In this example, the time of Wednesday is divided into three time zones, and no time zone 4 is not established for Wednesday. If the selection switch 22 is pressed (YES in STEP31), then Wednesday in the day display area 14 which has been flickering is now continuously turned on in STEP32. The user selects start-of-operation times and room temperature settings for the time zones 1 through 3. If the user selects a room temperature setting for the time zone 3 (YES in STEP60), then since the present time zone is not the time zone 4 (NO in STEP62), control returns to the operation sequence shown in FIG. 5 in STEP64, and the time zone 4 in the time zone display area 15 is flickered in STEP40. The user does not press the selection switch 22, but presses the timer switch 23. Now, the start-of-operation times and room temperature settings for the time zones 1 through 3 are established, but no data for the time zone 4, with respect to Wednesday.

When the setting of data for Wednesday is finished, the start-of-operation times and the operation statuses are transmitted from the timer setting means 5 to the memory means 6, which stores the transmitted data in an area for Wednesday. Though the memory means 6 has stored the data for the weekday group in the areas 41*a* corresponding to Monday through Friday, the memory means 6 stores the newly established data for Wednesday to overwrite the data in the area 41*c* of the memory 28 which corresponds to Wednesday, as shown in FIG. 3(*d*).

If the power supply switch 27 is turned on, then the operation control means 7 controls the air-conditioning unit 1 according to the data of the time zones and the operation statuses such as room temperature settings and operation stops which have been established by the timer setting means 5 and stored in the memory means 6. Specifically, the operation control means 7 controls the air-conditioning unit 1 according to the data established altogether for Monday and Tuesday in the weekday group.

On Wednesday, the operation control means 7 controls the air-conditioning unit 1 according to the data established individually for Wednesday as described above. Specifically, when the start-of-operation time of the time zone 1 is reached, the operation control means 7 controls the air-conditioning unit 1 to equalize the actual room temperature to the room temperature setting established for the time zone 1. When the start-of-operation time of the time zone 2 is reached, the operation control means 7 finishes the control of the air-conditioning unit 1 in the time zone 1, and controls the air-conditioning unit 1 to equalize the actual room temperature to the room temperature setting established for the time zone 2. The operation control means 7 similarly controls the air-conditioning unit 1 in the time zone 3. Since no start-of-operation time and operation statuses are established for the time zone 4, the operation control means 7 operates the air-conditioning unit 1 according to the operation statuses established for the time zone 3 for Wednesday, from the start-of-operation time of the time zone 3 to the start-of-operation time of the time zone 1 of Thursday. On Thursday and Friday, the operation control means 7 operates the air-conditioning unit 1 according to the data established altogether for the weekday group. On Saturday and Sunday, the operation control means 7 operates the air-conditioning unit 1 according to the data established altogether for the off-day group.

In the illustrated embodiment, the data established by the first, second, third setting means 8 through 10 are stored to overwrite the existing data in the single memory 28. However, respective memories may be assigned to the first, second, third setting means 8 through 10, and the user may select newly established data stored in one of the memories for enabling the operation control means 7 to operate the air-conditioning unit 1. Likewise, respective memories may be assigned to the first, second, third setting means 8 through 10, and the user may determine a priority sequence for giving priority to any of the data established by these setting means.

In the illustrated embodiment, a time zone is defined as extending from a start-of-operation time of a time zone to a start-of-operation time of a next time zone. However, each time zone may have a start-of-operation time and an end-of-operation time. While one week is divided into a weekday group ranging from Monday through Friday and an off-day group of Saturday and Sunday in the above embodiment, the user may divide one week into any desired groups.

The data of operation statuses for the air-conditioning unit may include, other than room temperature settings and operation stops, humidity settings if the air-conditioning unit is equipped with a dehumidifier or humidifier, and also other operation statuses such as quick heating and quick cooling.

Although a certain preferred embodiment of the present invention has been shown and described in detail, it should be understood that various changes and modifications may be made therein without departing from the scope of the appended claims.

What is claimed is:

1. An air-conditioning system comprising:

an air-conditioning unit;

timer setting means for establishing data including at least one time zone in the time of one day and an operation status in the time zone for the air-conditioning unit;

memory means for storing the data established by said timer setting means; and operation control means for controlling operation of said air-conditioning unit according to the data stored by said memory means;

said timer setting means including:

first setting means for establishing said data altogether for all days of the week;

second setting means for establishing said data for a plurality of groups divided from the days of the week;

third setting means for establishing said data individually for the days of the week; and selection means for successively selecting said first setting means, said second setting means, and said third setting means, and entering a mode for waiting for the establishment of data by a next one of said first setting means, said second setting means, and said third setting means when the establishment of the data by one of said first setting means, said second setting means, and said third setting means is finished, the arrangement being such that each time new data is established by either one of said first setting means, said second setting means, and said third setting means, said timer setting means corrects the data stored by said memory means into the new data and stores the new data in said memory means.

2. An air-conditioning system according to claim 1, wherein said timer setting means comprises means for overwriting the data stored by said memory means with the new data.

3. An air-conditioning system according to claim 1, wherein said operation status includes at least a room temperature setting and information indicating whether said air-conditioning unit is to be operated or not.

4. An air-conditioning system according to claim 1, wherein said groups include a weekday group and an off-day group.

5. An air-conditioning system according to claim 1, wherein each of said first setting means, said second setting means, and said third setting means comprises means for establishing a plurality of time zones in the time of one day.

6. An air-conditioning system according to claim 5, wherein each of said first setting means, said second setting means, and said third setting means comprises means for establishing start-of-operation times respectively for said time zones, each of said time zones extending from the start-of-operation time of the time zone to the start-of-operation time of the next time zone.

7. An air-conditioning system according to claim 1, further comprising display means for displaying said data, said timer setting means comprising means for enabling said display means to display any of the data established by said first setting means, said second setting means, and said third setting means, and correcting any of the data established by said first setting means, said second setting means, and said third setting means, when the establishment of the data by said first setting means, said second setting means, and said third setting means is finished.

* * * * *